United States Patent
Davis

(10) Patent No.: US 6,244,611 B1
(45) Date of Patent: Jun. 12, 2001

(54) BICYCLE SEAT HARNESS

(76) Inventor: Cynthia R. Davis, 1416 Park La., Ford Heights, IL (US) 60411

( * ) Notice: Subject to any disclaimer, the term of this patent is extended or adjusted under 35 U.S.C. 154(b) by 0 days.

(21) Appl. No.: 09/586,351

(22) Filed: Jun. 2, 2000

(51) Int. Cl.[7] .................................................. B62H 1/00
(52) U.S. Cl. ............................................ 280/290; 297/485
(58) Field of Search ............................ 280/290; 297/483, 297/484, 485, 473; 224/159, 160

(56) References Cited

U.S. PATENT DOCUMENTS

| D. 284,712 | 7/1986 | Loftin . | |
|---|---|---|---|
| D. 336,997 | 7/1993 | Williams . | |
| 482,271 | * 9/1892 | Openshaw et al. | 280/290 |
| 558,019 | * 4/1896 | Harshaw | 280/290 |
| 601,530 | * 3/1898 | Singleton | 280/290 |
| 742,800 | * 10/1903 | Patten | 280/290 |
| 4,429,419 | * 2/1984 | Snyder | 2/102 |
| 4,560,097 | 12/1985 | Reynolds et al. . | |
| 4,592,592 | 6/1986 | Peek . | |
| 4,981,306 | 1/1991 | Young . | |
| 5,076,598 | 12/1991 | Nauman . | |
| 5,839,965 | * 11/1998 | Mullins | 472/118 |
| 6,095,613 | * 8/2000 | Ostrander et al. | 297/467 |

FOREIGN PATENT DOCUMENTS

2061088 * 5/1981 (GB) .................................... 280/290

* cited by examiner

Primary Examiner—Robert P. Olszewski
Assistant Examiner—Michael Cuff

(57) ABSTRACT

A new bicycle seat harness for securing a rider to the seat of a bicycle. The inventive device includes a belt strap for wrapping around the waist of a rider. The first ends of a plurality of securing straps are coupled to the belt strap. A clamping portion of an anchor member is attached to a seat tube of the frame of a bicycle. The anchor member also has a securing portion to which a second end of each of the securing straps is attached to secure the rider to the seat of the bicycle.

5 Claims, 2 Drawing Sheets

BICYCLE SEAT HARNESS

BACKGROUND OF THE INVENTION

1. Field of the Invention

The present invention relates to safety harnesses and more particularly pertains to a new bicycle seat harness for securing a rider to the seat of a bicycle.

2. Description of the Prior Art

The use of safety harnesses is known in the prior art. More specifically, safety harnesses heretofore devised and utilized are known to consist basically of familiar, expected and obvious structural configurations, notwithstanding the myriad of designs encompassed by the crowded prior art which have been developed for the fulfillment of countless objectives and requirements.

Known prior art safety harnesses include U.S. Pat. Nos. 4,981,306; 4,560,097; U.S. Pat. No. Des. 284,712; U.S. Pat. No. 4,592,592; U.S. Pat. No. Des. 336,997; and U.S. Pat. No. 5,076,598.

While these devices fulfill their respective, particular objectives and requirements, the aforementioned patents do not disclose a new bicycle seat harness. The inventive device includes a belt strap for wrapping around the waist of a rider. The first ends of a plurality of securing straps are coupled to the belt strap. A clamping portion of an anchor member is attached to a seat tube of the frame of a bicycle. The anchor member also has a securing portion to which a second end of each of the securing straps is attached to secure the rider to the seat of the bicycle.

In these respects, the bicycle seat harness according to the present invention substantially departs from the conventional concepts and designs of the prior art, and in so doing provides an apparatus primarily developed for the purpose of securing a rider to the seat of a bicycle.

SUMMARY OF THE INVENTION

In view of the foregoing disadvantages inherent in the known types of safety harnesses now present in the prior art, the present invention provides a new bicycle seat harness construction wherein the same can be utilized for securing a rider to the seat of a bicycle.

The general purpose of the present invention, which will be described subsequently in greater detail, is to provide a new bicycle seat harness apparatus and method which has many of the advantages of the safety harnesses mentioned heretofore and many novel features that result in a new bicycle seat harness which is not anticipated, rendered obvious, suggested, or even implied by any of the prior art safety harnesses, either alone or in any combination thereof.

To attain this, the present invention generally comprises a belt strap for wrapping around the waist of a rider. The first ends of a plurality of securing straps are coupled to the belt strap. A clamping portion of an anchor member is attached to a seat tube of the frame of a bicycle. The anchor member also has a securing portion to which a second end of each of the securing straps is attached to secure the rider to the seat of the bicycle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new bicycle seat harness apparatus and method which has many of the advantages of the safety harnesses mentioned heretofore and many novel features that result in a new bicycle seat harness which is not anticipated, rendered obvious, suggested, or even implied by any of the prior art safety harnesses, either alone or in any combination thereof.

It is another object of the present invention to provide a new bicycle seat harness which may be easily and efficiently manufactured and marketed.

It is a further object of the present invention to provide a new bicycle seat harness which is of a durable and reliable construction.

An even further object of the present invention is to provide a new bicycle seat harness which is susceptible of a low cost of manufacture with regard to both materials and labor, and which accordingly is then susceptible of low prices of sale to the consuming public, thereby making such bicycle seat harness economically available to the buying public.

Still yet another object of the present invention is to provide a new bicycle seat harness which provides in the apparatuses and methods of the prior art some of the advantages thereof, while simultaneously overcoming some of the disadvantages normally associated therewith.

Still another object of the present invention is to provide a new bicycle seat harness for securing a rider to the seat of a bicycle.

Yet another object of the present invention is to provide a new bicycle seat harness which includes a belt strap for wrapping around the waist of a rider. The first ends of a plurality of securing straps are coupled to the belt strap. A clamping portion of an anchor member is attached to a seat tube of the frame of a bicycle. The anchor member also has a securing portion to which a second end of each of the securing straps is attached to secure the rider to the seat of the bicycle.

Still yet another object of the present invention is to provide a new bicycle seat harness that may be used to secure a child to a seat of a bicycle so that the child does not accidentally fall off of the seat while riding the bicycle.

Even still another object of the present invention is to provide a new bicycle seat harness that helps a rider feel more secure when riding on a bike, especially when learning to ride a bicycle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
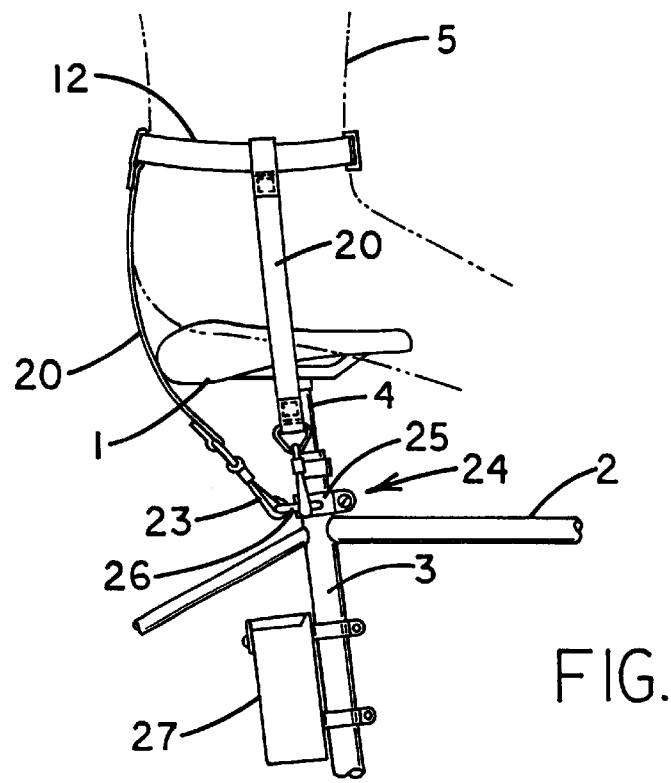
FIG. 1 is a schematic side view of a new bicycle seat harness in use according to the present invention.

With reference now to the drawings, and in particular to FIGS. 1 through 5 thereof, a new bicycle seat harness embodying the principles and concepts of the present invention and generally designated by the reference numeral 10 will be described.

With reference to FIG. 1, the harness 10 is designed for securing a rider 5 to the seat 1 of a bicycle. The bicycle has a frame 2 with a seat tube 3. The seat 1 of the bicycle has a seat post 4 which is inserted into the seat tube 3 of the frame 2 of the bicycle. As best illustrated in FIGS. 1 through 5, the bicycle seat harness 10 generally comprises a belt strap 12 for wrapping around the waist of a rider 5. The first ends 21 of a plurality of securing straps 20 are coupled to the belt strap 12. A clamping portion 25 of an anchor member 24 is attached to a seat tube 3 of the frame 2 of a bicycle. The anchor member 24 also has a securing portion 26 to which a second end 22 of each of the securing straps 20 is attached to secure the rider 5 to the seat 1 of the bicycle.

Figure 2:
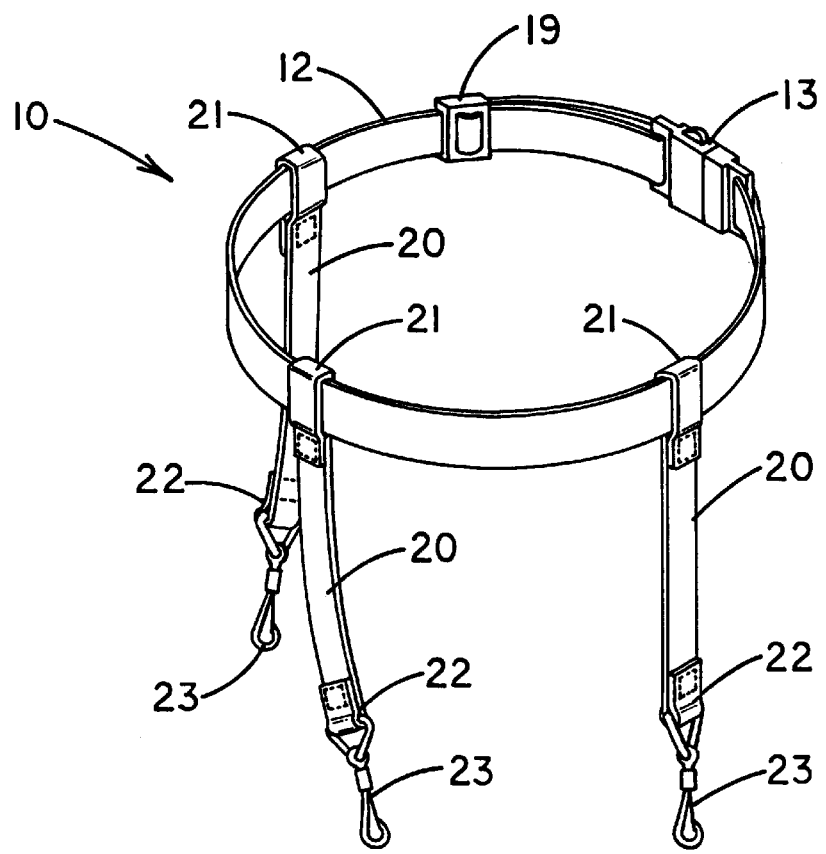
FIG. 2 is a schematic perspective view of the present invention.
Figure 3:
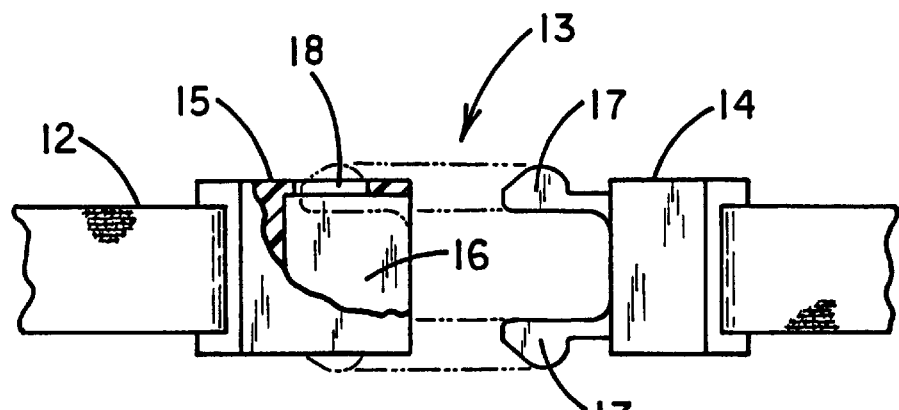
FIG. 3 is a schematic partial side view of the buckle region of the belt strap of the present invention.

In closer detail, the elongate flexible belt strap 12 has a pair of opposite ends and a length defined between the ends of the belt strap 12. The belt strap 12 is designed for wrapping around the waist of a rider 5. Preferably, a buckle 13 detachably attaches the ends of the belt strap 12 together to secure the belt strap 12 around the waist of the rider 5. With reference to FIG. 3, ideally, the buckle 13 comprises a quick-release buckle 13 having an insertion portion 14 and a receiving portion 15. The receiving portion 15 has a slot 16 while the insertion portion 14 has a pair of tabs 17 which are insertable into the slot 16 of the receiving portion 15. The receiving portion 15 also has a pair of openings 18 into the slot 16 of the receiving portion 15 into which a portion of the tabs 17 of insertion portion 14 are insertable into such that the tabs 17 of the insertion portion 14 are releasably held in the slot 16. Optionally, as illustrated in FIG. 2, the belt strap 12 also ideally includes a length adjustment buckle 19 attached thereon. The length adjustment buckle 19 is designed for adjusting the length of the belt strap 12 able to be wrapped around the waist of a rider 5.

The harness 10 also includes a plurality of elongate flexible securing straps 20. Each securing strap 20 has opposite first and second ends 21,22 and a length defined between the ends of the securing strap. The first ends 21 of the securing straps 20 are coupled to the belt strap 12 such that the securing straps 20 downwardly depend from the belt strap 12. Preferably, the securing straps depend from the belt strap with the lengths of the securing straps 20 extending generally perpendicular to the length of the belt strap 12 when the belt strap 12 is wrapped around the waist of a rider 5. As illustrated in FIG. 2, ideally, the first end 21 of each of the securing straps 20 is looped around the belt strap 12 such that each securing strap is slidably coupled to the belt strap 12 to permit adjustable positioning of the securing straps 20 along the length of the belt strap 12. As best illustrated in FIG. 2, the second end 22 of each of the securing straps 20 preferably has an attachment fastener 23 coupled thereto. Ideally, each of the attachment fastener 23s comprises a swivel spring catch.

Figure 4:
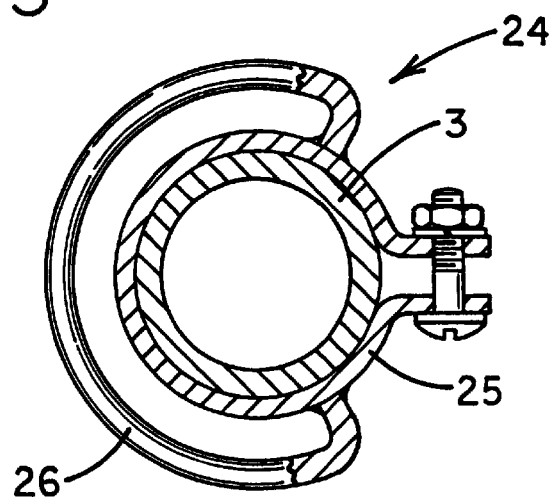
FIG. 4 is a schematic partial sectional view of the anchor member of the present invention.

With reference to FIG. 4, the harness 10 further includes an anchor member 24 having a clamping portion 25 and an elongate securing portion 26. The clamping portion 25 of the anchor member 24 is designed for attachment around to a seat tube 3 of a frame 2 of a bicycle seat 1 adjacent a seat post 4 of a seat inserted into the seat tube 3. Ideally, the clamping portion 25 comprises a ring clamp. The securing portion 26 of the anchor member 24 is preferably generally arcuate and has a pair of opposite ends which are coupled to the clamping portion 25 of the anchor member 24. As depicted in FIG. 1, the attachment fasteners 23 of the second ends 22 of the securing straps 20 are detachably attached to the securing portion 26 of the anchor member 24 so that a rider 5 is secured to the frame 2 of the bicycle when sitting on the seat 5 of the bicycle.

Figure 5:
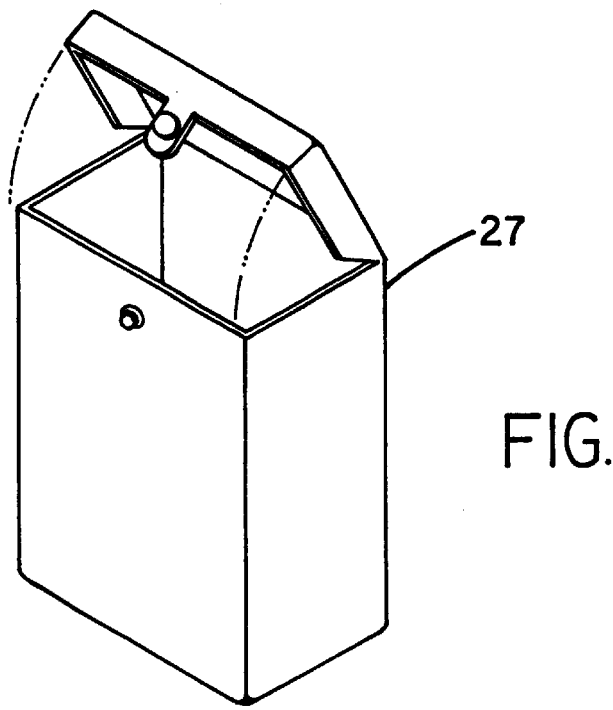
FIG. 5 is a schematic perspective view of the storage case of the present invention.

In an optional ideal embodiment, a storage case 27 for holding the harness therein may be provided as shown in FIG. 5. As illustrated in FIG. 1, the storage case 27 is attachable to the seat tube 3 of the frame 2 of the bicycle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. In combination:
   a bicycle having a frame having a seat tube, a seat of the bicycle having a seat post inserted into the seat tube of the frame of the bicycle; and
   a harness for securing a rider to the seat of a bicycle, said harness comprising:
   a belt strap for wrapping around the waist of a rider, said belt strap having a pair of opposite ends;
   a plurality of securing straps, each securing strap having first and second ends;
   said first end of each of said securing straps being coupled to said belt strap;
   an anchor member having a clamping portion and an elongate securing portion, said clamping portion of said anchor member being removably attached to a seat tube of the frame of the bicycle, said securing portion of said anchor member having a generally arcuate middle section and having a pair of opposite ends, said ends of said securing portion of said anchor member being coupled to said clamping portion of said anchor member; and
   said second end of each of said securing straps being detachably attached to said middle section of said securing portion of said anchor member.

2. The harness of claim 1, further comprising a buckle detachably attaching said ends of said belt strap together.

3. The harness of claim 1, wherein said first end of each of said securing straps is slidably coupled to said belt strap to permit adjustable positioning of said securing straps along said length of said belt strap.

4. The harness of claim 1, wherein said second end of said pair of ends of each of said securing straps has an attachment fastener coupled thereto, and wherein said attachment fasteners of said second ends of said securing straps are detachably attached to said securing portion of said anchor member.

5. In combination:
   a bicycle having a frame having a seat tube, a seat of the bicycle having a seat post inserted into the seat tube of the frame of the bicycle; and
   a harness for securing a rider to a seat of a bicycle, said harness comprising:
   a bicycle having a frame having a seat tube, a seat of the bicycle having a seat post inserted into the seat tube of the frame of the bicycle;
   an elongate flexible belt strap having a pair of opposite ends and a length defined between said ends of said belt strap, said belt strap being for wrapping around the waist of a rider;
   a buckle detachably attaching said ends of said belt strap together;
   a plurality of elongate flexible securing straps, each securing strap having opposite first and second ends and a length defined between said ends of the securing strap;
   said first end of each of said securing straps being coupled to said belt strap;
   wherein said first end of each of said securing straps is slidably coupled to said belt strap to permit adjustable positioning of said securing straps along said length of said belt strap;
   said second end of each of said securing straps having an attachment fastener coupled thereto;
   an anchor member having a clamping portion and an elongate securing portion,
   said clamping portion of said anchor member being for attachment to a seat tube of a frame of a bicycle seat; and
   said securing portion of said anchor member being generally arcuate and having a middle section and a pair of opposite ends, said ends of said securing portion of said anchor member being coupled to said clamping portion of said anchor member, said attachment fasteners of said second ends of said securing straps being detachably attached to said middle section of said securing portion of said anchor member.

* * * * *